United States Patent Office 3,635,983
Patented Jan. 18, 1972

3,635,983
11H-DIBENZO[1,2,5]TRIAZEPINES AND
THEIR SALTS
Jacques R. Boissier, Paris, and Roger Ratouis, Saint-Cloud, France, assignors to Societe Anonyme dite: Roussel-UCLAF, Paris, France
No Drawing. Filed Dec. 7, 1967, Ser. No. 694,770
Claims priority, application France, Dec. 16, 1966, 87,809; Mar. 16, 1967, 98,985, Patent 1,511,147
Int. Cl. C07d 55/54
U.S. Cl. 260—268 TR   7 Claims

ABSTRACT OF THE DISCLOSURE

The compounds are derivatives of 11H-dibenzo[1,2,5] triazepine and their acid addition and quaternary ammonium salts; they correspond to the formula:

(1)
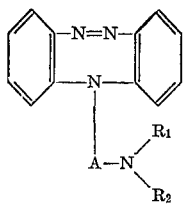

A: an alkylene radical containing from 2 to 4 carbon atoms.

$R_1$–$R_2$: lower alkyl or hydroxyalkyl radicals, or form with the nitrogen atom N to which they are bound a heterocyclic radical eventually substituted by one or several lower alkyl or hydroxyalkyl radicals.

They are very useful substances as therapeutics, namely, as thymoanaleptics, antiparkinsonians, anorectics, local anesthetics and antihistaminics.

The compounds of Formula 1 are prepared by reacting, in the presence of an alkaline agent, 11H-dibenzo[1,2,5]triazepine of formula:

(2)
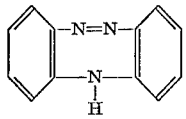

with a compound of formula:

(3)
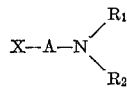

(X: halogen atom).

---

The present invention relates to derivatives of 11H-dibenzo[1,2,5]triazepine, their acid addition and quaternary ammonium salts and to the process for preparation thereof.

The products have proved to be very useful as therapeutics, namely as thymoanaleptics, antiparkinsonians, anorectics, local anesthetics and antihistaminics.

The 11H-dibenzo[1,2,5]triazepines, according to the invention, are represented by the general formula:

(1)
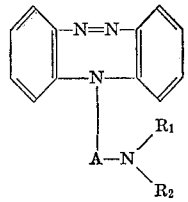

in which A represents a straight or branched alkylene radical containing from 2 to 4 carbon atoms and $R_1$ and $R_2$, which can be identical or different, represent lower alkyl or lower hydroxyalkyl radicals or form with the nitrogen atom N to which they are bound a heterocyclic radical such as 1-pyrrolidinyl, piperidino, morpholino, hexamethylene-imino, 1-piperazinyl, the said heterocyclic radical being eventually substituted by one or several lower alkyl or lower hydroxyalkyl radicals.

Lower alkyl or lower hydroxyalkyl radicals mean containing from 1 to 4 carbon atoms.

According to the invention, the 11H-dibenzo[1,2,5]triazepines of Formula 1 are prepared by reacting, in the presence of an alkaline agent, 11H-dibenzo[1,2,5]triazepine of formula:

(2)
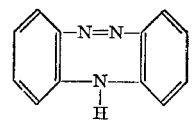

with a compound of formula:

(3)
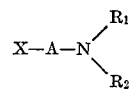

in which X represents a halogen atom and A, $R_1$ and $R_2$ have the meaning above defined, and by isolating the product of Formula 1 thus obtained.

Preferably, the alkaline agent is an alkali metal, an alkali metal alcoholate, an alkali metal hydroxide, an alkali metal hydride or an alkali metal amide. The process may advantageously be carried out by first reacting said alkaline agent with 11H-dibenzo[1,2,5]triazepine, then treating the obtained product with a compound of Formula 3. The reaction is preferably performed in an anhydrous organic solvent such as benzene, toluene or xylene and at the boiling temperature of the reaction medium.

On completion of the reaction, the product of Formula 1 is isolated by conventional means. It can be, for instance, extracted with an acid solution, from which it is afterwards precipitated by alkalinisation. It may be then purified by recrystallization.

The 11H-dibenzo[1,2,5]triazepines of Formula 1 have a basic character and, according to the invention, their acid addition salts are prepared by treating the said 11H-dibenzo[1,2,5]triazepines with the corresponding organic or inorganic acids, preferably in the presence of a solvent. Anhydrous solvents, such as benzene, ethyl ether, ethanol, acetone are advantageously used. According to the invention, the quaternary ammonium salts are prepared by treating the said 11H-dibenzo[1,2,5]triazepines with the corresponding quaternizing agents, preferably in the presence of a solvent. Anhydrous solvents, such as ethyl ether, acetonitrile, acetone, dioxane, methanol, ethanol are advantageously used. The salts can be prepared without isolating the product of Formula 1 from the reaction medium where it was obtained.

The new drugs, according to the invention, are endowed with pharmacological properties of great interest. They are very active namely as thymoanaleptics, antiparkinsonians, anorectics, local anesthetics and antihistaminics.

More especially were investigated 11-(3-dimethylaminopropyl) 11H-dibenzo[1,2,5]triazepine (designated hereafter 1134–01), 11-(2-dimethylaminopropyl) 11H-dibenzo[1,2,5]triazepine (designated hereafter 1134–02), 11-(2-piperidinoethyl) 11H - dibenzo[1,2,5]triazepine (designated hereafter 1134–03), 11-(2-dimethylaminoethyl) 11H-dibenzo[1,2,5]triazepine (designated hereafter 1134–04) and 11-[3-(4-methyl 1-piperazinyl) propyl] 11H-dibenzol[1,2,5]triazepine (designated hereafter 1134–05). These bases were experimented after dissolution in a dilute acid. The results obtained were as follows:

(a) Lethal dose 50 (L.D. 50) determined by intraperitoneal route in mice was respectively 91 mg./kg. for 1134–01 and 129 mg./kg. for 1134–02. Under the same conditions, the L.D. 50 was about 75 mg./kg. for 1134–03 and 150 mg./kg. for 1134–04 and 1134–05.

(b) On guinea-pig isolated ileum, according to Magnus' method, the effective concentrations (or effective doses 50: E.D. 50) of the tested compounds were determined against the contracturing action of acetylcholine and histamine. The results have been summarized in the undermentioned able.

TABLE

| Studied compounds | E.D. 50 against acetylcholine | E.D. 50 against histamine |
| --- | --- | --- |
| 1134–01 | $2 \times 10^{-7}$ | $10^{-8}$ |
| 1134–02 | $5 \times 10^{-8}$ | $2 \times 10^{-8}$ |
| 1134–03 | $10^{-7}$ | $10^{-8}$ |
| 1134–04 | $10^{-7}$ | $2 \times 10^{-8}$ |
| 1134–05 | $5 \times 10^{-6}$ | $2 \times 10^{-8}$ |

(c) According to Halpern's method (Arch. Inter. Pharmacodyn. 1942, 68, 339), compound 1134–02 provoked a total or subtotal inhibition of the acetylcholinic bronchoconstriction in guinea-pigs from the dose of 0.1 mg./kg. through intravenous route; according to the same technique and route, compounds 1134–03 and 1134–04 had a clear antagonistic action from the dose of 0.5 mg./kg., compound 1134–01 from the dose of 1 mg./kg. and 1134–05 from about the dose of 2 mg./kg.

(d) The studied compounds, administered at the dose of 25 mg./kg. by intraperitoneal route, practically suppressed the tremors and the muscarinic syndrome produced by intraperitoneal administration, in mice of 20 mg./kg. of tremorine.

(e) According to L. Ther and Schramm's method (Arch. Inter. Pharmacodyn. 1962, 138, 302) compounds 1134–01, 1134–02 and 1134–03, injected by intraperitoneal route, in mice, and at the same time than a subcutaneous dose of 10 mg./kg. of apomorphine hydrochloride, brought a clear increase of gnawing from the dose of 1 mg./kg.; under the same conditions, the active dose of 1134–04 and of 1134–05 was 3 mg./kg. These results prove the thymoanaleptic activity.

(f) The studied compounds exhibited an important anti-cataleptic power. For instance, operating by J. R. Boissier and P. Simon's test (Therapie 1953, 18, 1257–1277) and administering by peritoneal route in rats, it has been established that the studied compounds at the dose of 10 mg./kg., one hour before the intraperitoneal injection of 15 mg./kg. of prochlorpemazine, exhibited a very significant anticataleptic power for 5 hours (1134–02) or for one hour and a half (1134–01 and 1134–04).

(g) The anorectic action of 1134–01 and of 1134–02 had proved to be very interesting. It has been observed that, for instance, their administration, at the dose of 10 mg./kg. by intraperitoneal route in rats, reduced the consumption of food and drinks of the animals by approximately 35%.

(h) 1134–01 and 1134–02, from the concentration of 0.5%, showed a high local anesthetic activity according to Regnier's technique (C. R. de l'Acad. Sc. 1923, 177, 558) on the rabbit's cornea.

(i) Lastly, the antihistaminic activity of the compounds was also found by Halpern's technique (Arch. Inter. Pharmacodyn. 1942, 68, 334–408—Histaminic bronchospasm test).

Because of their pharmacological properties, 11H-dibenzo[1,2,5]triazepines of general Formula 1 and their acid addition and quaternary ammonium salts constitute very useful medicines as therapeutics. They can be, thereby, used in treatment of depressed conditions, particularly in geriatrics for neurotic states, reactional depressions, behaviour and character disturbances, or in pediatrics in case of affective indifference, of obsessional neurosis and for the preparation to psychotherapy, or also in treatment of akinetic symptoms of Parkinson's disease. These compounds can be also used in treatment of obesity, in the general indications of local anesthetics in medicine, surgery and dentistry and in the general indications of antihistaminics (anaphylactic shocks, skin allergies, allergic asthmas, gastritis).

The usual dose varies according to the produced used, the patient treated, the disease concerned, and the administration route selected; it may be, for example, as thymoanaleptic from 5 mg. to 250 mg. per day by oral route in humans.

As medicines, the 11H-dibenzo[1,2,5]triazepines of general Formula 1, according to the invention, can be employed either in the form of bases or in the form of pharmaceutically acceptable acid addition or quaternary ammonium salts. Preference is given among the acid addition salts to those obtained with the following acids: hydrochloric, hydrobromic, hydriodic, nitric, sulfuric, phosphoric, acetic, maleic, fumaric, tartaric, benzoic, cinnamic, cyclohexylsulfamic, and among the quaternary ammonium salts to those obtained with alkyl halides such as, for example, methyl chloride, methyl bromide, methyl iodide, hydroxyalkyl halides such as, for instance, 2-hydroxyethyl chloride, bromide or iodide, alkyl sulfates such as, for instance, dimethyl sulfate, alkyl-alkane sulfonates or alkyl-arene sulfonates such as methyl-methane sulfonate, methyl benzene sulfonate or methyl toluene sulfonate.

The present invention is also concerned with pharmaceutical compositions which comprise as active principles one at least of the compounds of the general Formula I and/or their acid addition salts and/or their quaternary ammonium salts. These compositions are prepared so that they can be administered by digestive, parenteral or local route; they can be solid or liquid. The pharmaceutical compositions are those usually employed in human medicine, as for example tablets, coated or not, capsules, granulated substances, solutions, syrups, suppositories, parenteral preparations, ointments, creams, gels, aerosols; they are prepared according to usual means. The active principle or principles thereof are incorporated with excipients which are normally employed in those pharmaceutical compositions, such as, for example, talcum, gum arabic, lactose, starch, magnesium stearate, cocoa butter, aqueous or non-aqueous vehicles, animal or vegetable fatty substances, paraffin derivatives, glycols, various wetting, dispersing and emulsifying agents and preservatives.

The following non limiting examples illustrate the invention.

EXAMPLE 1

11-(3-dimethylaminopropyl) 11H-dibenzo[1,2,5] triazepine

To a solution of sodium amide prepared from 0.65 g. of sodium and 300 ml. of liquid ammonia was added 5 g. (0.025 mole) of 11H-dibenzo[1,2,5]triazepine. After removing ammonia, 150 ml. of anhydrous toluene were added and the mixture was heated under reflux for half an hour. After cooling, a solution of 3.4 g. (0.031 mole) of 3-dimethylaminopropyl chloride in 50 ml. of anhydrous toluene was added dropwise. The reaction mixture was boiled to reflux for 5 hours, then poured into water and the organic phase was extracted with dilute hydrochloric acid. The aqueous phase was made alkaline by addition of a dilute sodium hydroxide solution, and the resulting oil was extracted with benzene; benzene was dried and concentrated under vacuum to a crystalline residue. Recrystallization from a mixture of ethanol and water gave 4.5 g. (63%) of 11-(3-dimethylaminopropyl) 11H-dibenzo[1,2,5]triazepine as brick red crystals. Melting point: 107° C.–109° C. on a heating stage microscope.

Analysis.—$C_{17}H_{20}N_4$. Calculated (percent): C, 72.8; H, 7.2; N, 20.0. Found (percent): C, 72.4; H, 7.6; N, 19.7.

EXAMPLE 2

11-(2-dimethylaminopropyl) 11H-dibenzo[1,2,5] triazepine

Following the procedure described in Example 1, but using 3.4 of a base (obtained by alkalinisation of an aqueous solution of 2-dimethylaminopropyl chloride hydrochloride, followed by an extraction with ether, a concentration and a distillation), a solid residue was obtained. Recrystallization from cyclohexane yielded 2.5 g. (33%) of 11-(2-dimethylaminopropyl) 11H-dibenzo[1,2,5]triazepine as brown yellow crystals. Melting point: 115° C.–116° C. on a heating stage microscope.

*Analysis.*—$C_{17}H_{20}N_4$. Calculated (percent): C, 72.8; H, 7.2; N, 20.0. Found (percent): C, 72.7; H, 7.3; N, 19.5.

EXAMPLE 3

11-(2-dimethylaminopropyl) 11H-dibenzo[1,2,5] triazepine

Following the procedure described in Example 1, but using 3.4 g. (0.031 mole) of a base (obtained by alkalinisation of an aqueous solution of 2-dimethylaminoisopropyl chloride hydrochloride, followed by an extraction with ether, a concentration and a distillation), a solid residue was obtained. Recrystallization from cyclohexane yielded 2.6 g. (36%) of 11-(2-dimethylaminopropyl) 11H-dibenzo[1,2,5]triazepine as brown yellow crystals. Melting point: 116° C. on a heating stage microscope.

EXAMPLE 4

11-(2-dimethylaminopropyl) 11H-dibenzo[1,2,5] triazepine hydrogen fumarate

A solution of 0.450 g. of fumaric acid in methanol was mixed with a solution of 1 g. of 11-(2-dimethylaminopropyl) 11H-dibenzo[1,2,5]triazepine in methanol. Anhydrous ethyl ether was added till precipitation and the solid obtained was separated by filtration. Recrystallization from a mixture of methanol and ethyl ether yielded 0.9 g. of 11-(2-dimethylaminopropyl) 11H-dibenzo[1,2,5] triazepine hydrogen fumarate as yellow crystals. Melting point: 188° C. in an open glass capillary.

*Analysis.*—$C_{21}H_{24}N_4O_4$. Calculated (percent): C, 63.6; H, 6.1; N, 14.1. Found (percent): C, 63.5; H, 6.3; N, 14.1.

EXAMPLE 5

11-(2-dimethylaminopropyl) 11H-dibenzo[1,2,5] triazepine methiodide

To a solution of 1 g. of 11-(2-dimethylaminopropyl) 11H-dibenzo[1,2,5]triazepine in 100 ml. of anhydrous ethyl ether was added 5 g. of methyl iodide. After standing for 2 days at room temperature, 1 g. of 11-(2-dimethylaminopropyl) 11H-dibenzo[1,2,5]triazepine methiodide was separated by filtration as greenish crystals. Melting point: 140° C. in an open glass capillary.

*Analysis.*—$C_{18}H_{23}IN_4$. Calculated (percent): C, 51.2; H, 5.5. Found (percent): C, 51.4; H, 5.7.

EXAMPLE 6

11-(2-piperidinoethyl) 11H-dibenzo[1,2,5]triazepine

Following the procedure described in Example 1, but using 4.6 g. (0.031 mole) of 2-piperidinoethyl chloride, recrystallization from a mixture of acetone and hexane afforded 2.6 g. (33%) of 11-(2-piperidinoethyl) 11H-dibenzo[1,2,5]triazepine as yellow crystals. Melting point: 99° C.–100° C. in an open glass capillary.

*Analysis.*—$C_{19}H_{22}N_4$. Calculated (percent): C, 74.5; H, 7.2; N, 18.3. Found (percent): C, 74.6; H, 7.4; N, 18.4.

EXAMPLE 7

11-(2-dimethylaminoethyl) 11H-dibenzo[1,2,5] triazepine

Following the procedure described in Example 1, but using 3.3 g. 0.031 mole) of 2-dimethylaminoethyl chloride, recrystallization from cyclohexane afforded 2.3 g. (34%) of 11-(2-dimethylaminoethyl) 11H-dibenzo[1,2,5] triazepine as brick red crystals. Melting point: 129° C. on a heating stage microscope.

*Analysis.*—$C_{16}H_{18}N_4$. Calculated (percent): C, 72.2; H, 6.8; N, 21.0. Found (percent): C, 72.2; H, 7.2; N, 21.1.

EXAMPLE 8

11-[3-(4-methyl 1-piperazinyl)propyl] 11H-dibenzo[1,2,5]triazepine

Following the procedure described in Example 1, but using 5.5 g. (0.031 mole) of 3-(4-methyl 1-piperazinyl) propyl chloride, recrystallization from cyclohexane afforded 3 g. (35%) of 11-[3-(4-methyl 1-piperazinyl) propyl] 11H-dibenzo[1,2,5]triazepine as brick red crystals. Melting point: 130° C. on a heating stage microscope.

*Analysis.*—$C_{20}H_{25}N_5$. Calculated (percent): C, 71.6; H, 7.5; N, 20.9. Found (percent): C, 75.6; H, 7.6; N, 21.0.

EXAMPLE 9

11-(3-dimethylamino 2-methyl propyl) 11H-dibenzo-[1,2,5]triazepine

Following the procedure described in Example 1, but using 4.2 g. (0.031 mole) of 3-dimethylaminoisobutyl chloride, recrystallization from cyclohexane afforded 2.8 g. (37%) of 11-(3-dimethylamino 2-methyl propyl) 11H-dibenzo[1,2,5]triazepine as brick red crystals. Melting point: 114–115° C. in an open glass capillary.

*Analysis.*—$C_{18}H_{22}N_4$. Calculated (percent): C, 73.4; H, 7.5; N, 19.0. Found (percent): C, 73.5; H, 7.8; N, 19.1.

EXAMPLE 10

Tablets were prepared which corresponded to the formula:

|  | Mg. |
|---|---|
| 11 - (3 - dimethylaminopropyl) 11H-dibenzo[1,2,5]-triazepine hydrogen fumarate | 25 |
| Excipient s.q. for a tablet | 200 |

Excipient: lactose, starch, talcum, magnesium stearate.

EXAMPLE 11

Tablets were prepared which corresponded to the formula:

|  | Mg. |
|---|---|
| 11 - (2 - dimethylaminopropyl) 11H-dibenzo[1,2,5]-triazepine hydrogen fumarate | 25 |
| Excipient s.q. for a tablet | 200 |

Excipient: lactose, starch, talcum, magnesium stearate.

EXAMPLE 12

Parenteral preparations were prepared which corresponded to the formula:

| | |
|---|---|
| 11-(3-dimethylaminopropyl) 11H-dibenzo[1,2,5]-triazepine | mg 25 |
| Excipient s.q. for | ml 5 |

EXAMPLE 13

Parenteral preparations were prepared which corresponded to the formula:

| | |
|---|---|
| 11-(2-dimethylaminopropyl) 11H-dibenzo[1,2,5]-triazepine | mg 25 |
| Excepient s.q. for | ml 5 |

EXAMPLE 14

An ointment was prepared which corresponded to the formula:

|  | G. |
|---|---|
| 11 - (2 - piperidinoethyl) 11H - dibenzo[1,2,5]-triazepine | 2 |
| Excipient s.q. for | 100 |

We claim:
1. A compound having the formula:

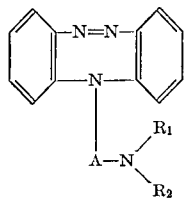

in which A is alkylene having from 2 to 4 carbon atoms and R₁ and R₂ are lower alkyl, lower hydroxyalkyl or, with the nitrogens are joined to form piperidino or 4-lower alkyl piperazino, and pharmaceutically acceptable acid additions and monomethyl quaternary ammonium salts thereof.

2. A compound selected from the group consisting of 11 - (3 - dimethylaminopropyl) 11H-dibenzo[1,2,5]triazepine and its pharmaceutically acceptable acid addition and quaternary ammonium salts.

3. A compound selected from the group consisting of 11 - (2 - dimethylaminopropyl) 11H-dibenzo[1,2,5]triazepine and its pharmaceutically acceptable acid addition and quaternary ammonium salts.

4. A compound selected from the group consisting of 11-(2-piperidinoethyl) 11H-dibenzo[1,2,5]triazepine and its pharmaceutically acceptable acid addition and quaternary ammonium salts.

5. A compound selected from the group consisting of 11-(2-dimethylaminoethyl) 11H-dibenzo[1,2,5]triazepine and its pharmaceutically acceptable acid addition and quaternary ammonium salts.

6. A compound selected from the group consisting of 11-[3-(4-methyl 1 - piperazinyl) propyl] 11H - dibenzo-[1,2,5]triazepine and its pharmaceutically acceptable acid addition and quaternary ammonium salts.

7. A compound selected from the group consisting of 11-(3-dimethylamino 2 - methyl propyl) 11H - dibenzo-[1,2,5]triazepine and its pharmaceutically acceptable acid addition and quaternary ammonium salts.

References Cited
UNITED STATES PATENTS

| | | | |
|---|---|---|---|
| 3,133,086 | 5/1964 | Bossard | 260—268 X |
| 3,257,404 | 6/1966 | Fouche | 260—268 |
| 3,322,789 | 5/1967 | Kreghbaum | 260—268 X |
| 3,454,598 | 7/1969 | Yale | 260—268 X |
| 3,476,758 | 11/1969 | Fouche | 260—293 |

DONALD G. DAUS, Primary Examiner

U.S. Cl. X.R.

260—239 DD, 247.5, 268 R, 293 D, 326.81; 424—250, 267